United States Patent
Huang et al.

(10) Patent No.: US 9,035,478 B2
(45) Date of Patent: May 19, 2015

(54) AIRCRAFT ENGINE CONSTANT FREQUENCY STARTER/GENERATOR

(71) Applicant: GE Aviation Systems LLC, Grand Rapids, MI (US)

(72) Inventors: Hao Huang, Troy, OH (US); David Dimitri Karipides, Casstown, OH (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 29 days.

(21) Appl. No.: 14/010,037

(22) Filed: Aug. 26, 2013

(65) Prior Publication Data
US 2015/0054283 A1 Feb. 26, 2015

(51) Int. Cl.
*F02N 11/04* (2006.01)
*H02K 23/52* (2006.01)

(52) U.S. Cl.
CPC .................................... *H02K 23/52* (2013.01)

(58) Field of Classification Search
USPC ...................................................... 290/31, 46
See application file for complete search history.

(56) References Cited

U.S. PATENT DOCUMENTS

| | | | |
|---|---|---|---|
| 4,554,501 A | 11/1985 | Baker | |
| 5,015,941 A | 5/1991 | Dhyanchand | |
| 5,097,195 A | 3/1992 | Raad et al. | |
| 5,581,168 A | 12/1996 | Rozman et al. | |
| 7,508,086 B2 | 3/2009 | Huang et al. | |
| 7,821,145 B2 | 10/2010 | Huang et al. | |
| 8,030,788 B2 * | 10/2011 | Xu et al. | 290/31 |
| 8,148,834 B2 | 4/2012 | Huang et al. | |
| 8,232,702 B2 * | 7/2012 | Zywot et al. | 310/214 |
| 2004/0056487 A1 * | 3/2004 | Sarlioglu et al. | 290/52 |
| 2004/0108726 A1 * | 6/2004 | Sarlioglu et al. | 290/38 R |
| 2006/0061319 A1 | 3/2006 | Markunas et al. | |

OTHER PUBLICATIONS

Combined Search Report and Exam Report for corresponding GB Application No. 1415082.5 Dated Mar. 12, 2015.

* cited by examiner

*Primary Examiner* — Tho D Ta
(74) *Attorney, Agent, or Firm* — General Electric Company; William S. Munnerlyn

(57) ABSTRACT

A constant frequency starter/generator for a turbine engine includes a first inverter/converter, a second inverter/converter, a DC link electrically connecting the first inverter/converter to the second inverter/converter, and an electric machine having a synchronous main machine, wherein the constant frequency starter/generator is operable in a start mode and a run mode.

14 Claims, 3 Drawing Sheets

AIRCRAFT ENGINE CONSTANT FREQUENCY STARTER/GENERATOR

BACKGROUND OF THE INVENTION

There currently exist starter/generator systems for aircraft, which are used to both start an aircraft engine, and to convert mechanical energy from the aircraft engine after it has started to electrical energy for power systems on the aircraft. In these systems, for instance, variable voltage, variable frequency power is connected to drive the starter/generator in a starting mode. After starting, the starter/generator operates in a generating mode, generating power for the aircraft.

BRIEF DESCRIPTION OF THE INVENTION

In one aspect, a constant frequency starter/generator for a turbine engine includes: a first inverter/converter having a first constant frequency AC input, a first constant frequency AC output, a first DC input, and a first DC output; a second inverter/converter having a second AC input, a second AC output, a second DC input, and a second DC output; a DC link electrically connecting the first DC output to the second DC input and the second DC output to the first DC input; an electric machine having a synchronous main machine having an AC input electrically connected to the second AC output and an AC output electrically connected to the second AC input, and an AC exciter having an AC input electrically connected to a the AC output of the third DC to AC inverter. The second inverter/converter operates in a starting mode, where the second inverter/converter electrically disconnects the main machine AC output from the second AC input and electrically connects the main machine AC input to the second AC output to start the main machine in the starting mode, and a generating mode, where the second inverter/converter electrically connects the exciter AC input to the second AC output, electrically disconnects the main machine AC input from the second AC output, and electrically connects the main machine AC output to the second AC input to run the main machine in the generating mode.

In another aspect, a method of operating an electric machine having a synchronous main machine and exciter, the method comprising: starting the electric machine in a starting mode by receiving an AC input from an external power source, converting the AC input to a DC output with a first inverter/converter, converting the DC output to a second AC input by supplying the DC output to a second inverter/converter, and supplying the second AC output to the main machine to start rotation of the main machine; after the starting of rotation of the main machine, running the electric machine in a generating mode by accelerating the synchronous main machine by supplying a third AC output to the exciter; and supplying generated electricity by generating a fourth AC output with the main machine during the generating mode, converting the fourth AC output to a second DC output with the second inverter/converter, and converting the second DC output to a fifth AC output.

DESCRIPTION OF EMBODIMENTS OF THE INVENTION

Figure 1:
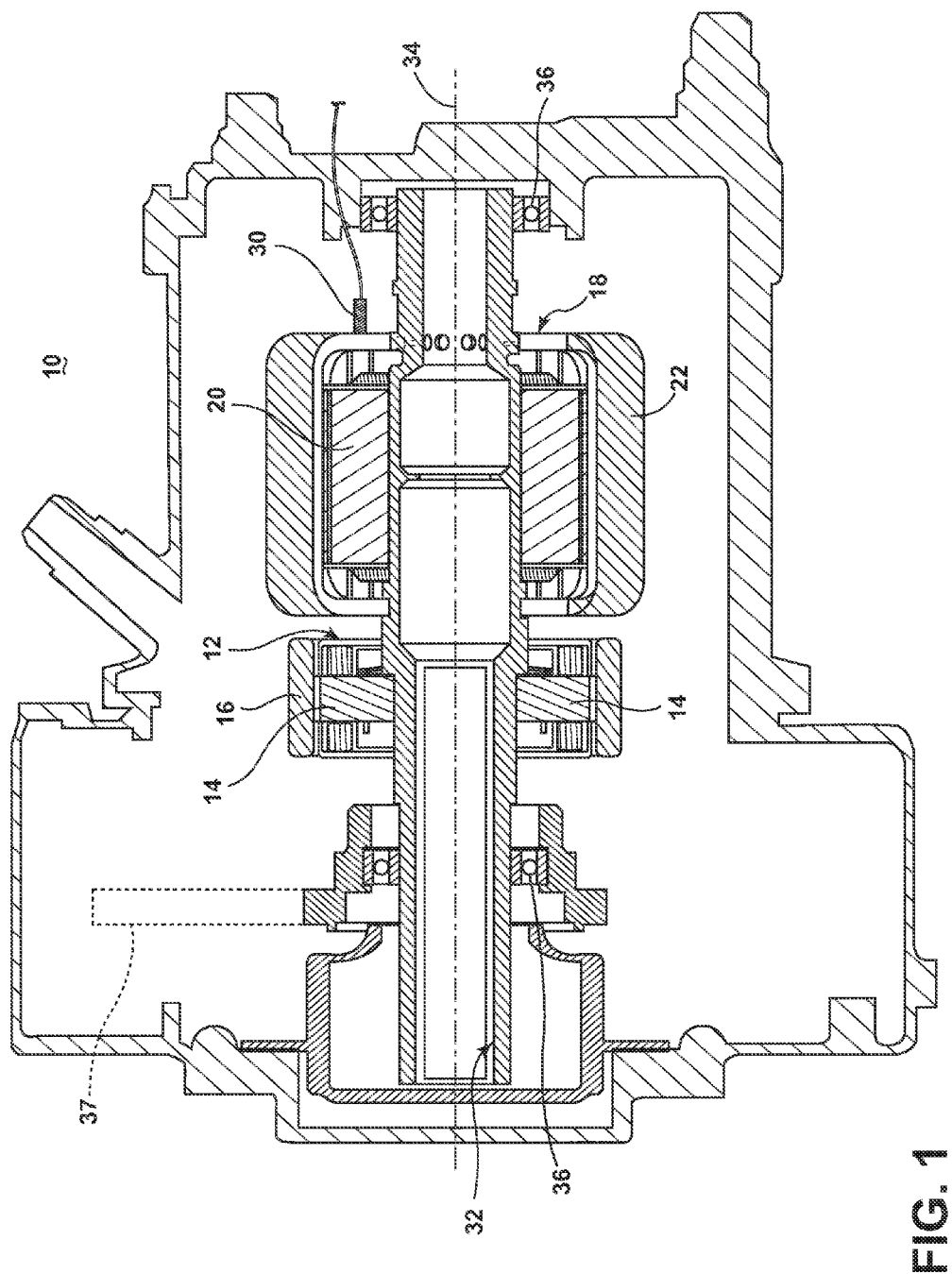
FIG. 1 is a sectional view of a starter/generator assembly.

While embodiments of the invention may be implemented in any environment using, for instance, a synchronous machine or main machine, a specific example of which is a starter/generator (S/G). The S/G is currently contemplated to be implemented in a jet engine environment. A brief summary of the contemplated environment and an example starting method should aid in a more complete understanding. FIG. 1 illustrates an electric machine assembly 10 mounted on or within a gas turbine aircraft engine. The gas turbine engine may be a turbofan engine, such as a General Electric GEnx or CF6 series engine, commonly used in modern commercial and military aviation or it could be a variety of other known gas turbine engines such as a turboprop or turboshaft. The gas turbine engine may also have an afterburner that burns an additional amount of fuel downstream of the low pressure turbine region to increase the velocity of the exhausted gases, and thereby increasing thrust.

The electrical machine assembly 10 comprises a first machine 12 having an exciter rotor 14 and an exciter stator 16, and a synchronous second machine 18 having a main machine rotor 20 and a main machine stator 22. At least one power connection is provided on the exterior of the electrical machine assembly 10 to provide for the transfer of electrical power to and from the electrical machine assembly 10. Power is transmitted by this power connection, shown as an electrical power cable 30, directly or indirectly, to the electrical load and may provide for a three phase with a ground reference output from the electrical machine assembly 10.

The electrical machine assembly 10 further comprises a rotatable shaft 32 mechanically coupled to a source of axial rotation, which may be a gas turbine engine (not shown), about a common axis 34. The rotatable shaft 32 is supported by spaced bearings 36. The exciter rotor 14 and main machine rotor 20 are mounted to the rotatable shaft 32 for rotation relative to the stators 16, 22, which are rotationally fixed within the electrical machine assembly 10. The stators 16, 22 may be mounted to any suitable part of a housing portion of the electrical machine assembly 10. The electrical machine assembly 10 may also comprise a mechanical shaft 37 (shown as a schematic box) that couples the rotatable shaft 32, for instance, with the gas turbine engine (not shown). The mechanical shaft 37 is configured such that rotation of the rotatable shaft 32 produces a mechanical force that is transferred through the shaft 37 to provide rotation to the gas turbine engine.

In the illustrated embodiment, the second machine 18 is located in the rear of the electric machine assembly 10 and the first machine 12 is positioned in the front of the electric machine assembly 10. Other positions of the first machine 12 and the second machine 18 are envisioned.

Figure 2:
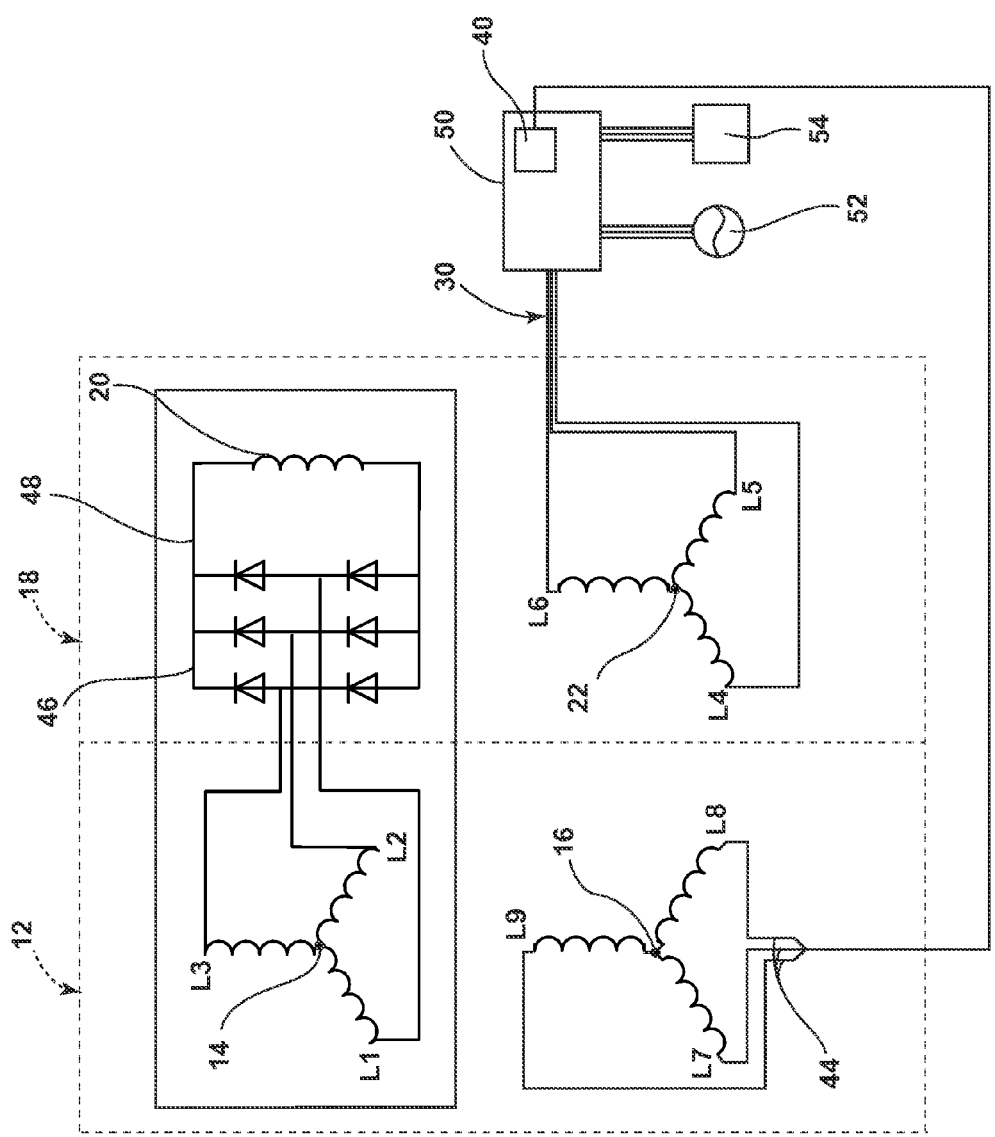
FIG. 2 is a schematic view of a starter/generator assembly rotatable shaft.

Turing now to FIG. 2, the electric machine assembly 10 further comprises an external exciter inverter 40 coupled with the exciter stator 16 by output leads 44, wherein the inverter 40 may be schematically located inside a control circuit 50. As shown, the exciter stator 16 comprises three leads L7, L8, L9 for providing three phase excitation. The exciter inverter 40 provides three phase AC power to provide excitation to each of the three exciter stator 16 leads L7, L8, L9. Although the exciter stator 16 is shown having three leads L7, L8, L9, alternative configurations are envisioned wherein the stator 16 may have only a single lead, or any number of multiple leads. Correspondingly, the exciter inverter 40 may provide single or multiple phase AC power to each of the configured leads.

The exciter rotor 14 comprises windings arranged to provide for three phase output along leads L1, L2, L3 which, as illustrated, are supplied to a rectifier 46, which is illustrated as a diode-based rotating rectifier. The rectifier 46 further supplies a common supply line 48 to the main machine rotor 20.

The main machine stator 22 has leads L4, L5, L6 arranged to couple with the control circuit 50 wherein the stator 22 may be coupled with an external alternating current (AC) power source, such as a constant frequency auxiliary power unit (APU) 52 and an electrical power distribution node 54 of the aircraft. Alternate constant frequency external power sources are envisioned, including the power output of another running turbine engine or another electric machine 10, a common three phase wall plug, a ground power cart or even a direct current (DC) source such as batteries, when coupled with an inverter to generate the necessary three phase power.

Figure 3:
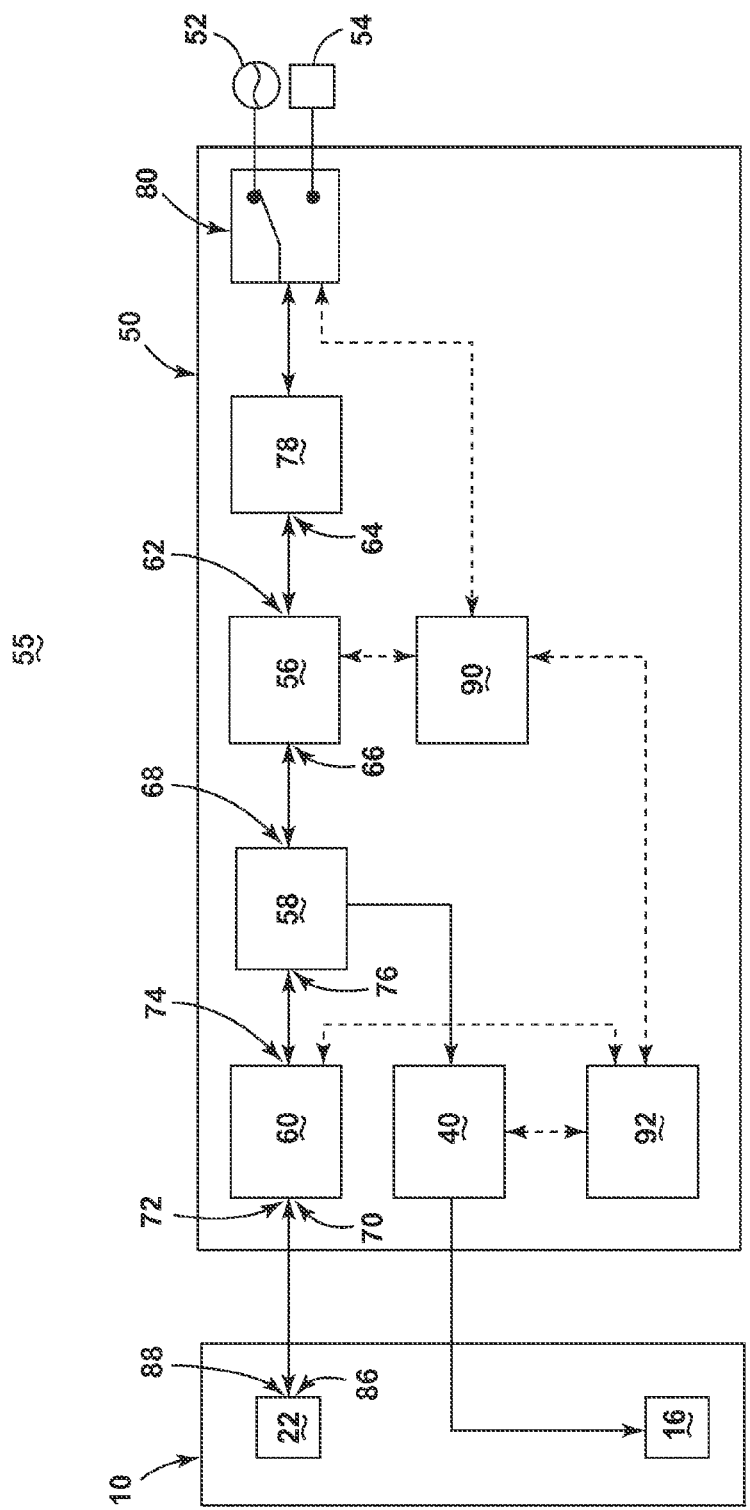
FIG. 3 is a schematic view of the constant frequency starter/generator according to an embodiment of the invention.

FIG. 3 illustrates the constant frequency starter/generator 55 according to one embodiment of the invention. As shown, the starting control circuit comprises a first inverter/converter 56, a second inverter/converter 60, and a DC link 58. The first inverter/converter 56 includes a first constant frequency AC input 62, a first constant frequency AC output 64, a first DC input 66, and a first DC output 68. The second inverter/converter includes a second AC input 70, a second AC output 72, a second DC input 74, and a second DC output 76.

The DC link 58 may include an electrically conductive material, such as transmission wire, which extends between the first and second inverter/converters 56, 60 and electrically couples the first DC output 68 to the second DC input 74, and electrically couples the second DC output 76 to the first DC input 66. The DC link 58 is also electrically coupled with the exciter inverter 40. Additionally, it is noted that the DC link 58 may span a much longer transmission length than represented in the schematic view of FIG. 3, for instance, it may span across the length of an aircraft.

The control circuit 50 is shown further comprising an optional output filter 78 and an electronic switch 80, wherein the output filter 78 comprises, for instance, a low pass filter, and is coupled with the first AC input 62 and the first AC output 64. The output filter 78 may also be electrically coupled with the electronic switch 80. The electronic switch 80 is illustrated having a first and second position, wherein the output filter 78 is electrically coupled with the APU 52 and the output filter 78 is electrically disconnected with the electrical power distribution node 54 when the switch 80 is in the first position, and the output filter 78 is electrically coupled with the electrical power distribution node 54 and the output filter 78 is electrically disconnected from the APU 52 when the switch 80 is in the second position.

In embodiments not having the optional output filter 78, the electronic switch 80 may be coupled directly with the first inverter/converter 56 such that the first AC input 62 is electrically connected with the APU 52 and first AC output 64 is electrically disconnected with the electrical power distribution node 54 when the switch 80 is in the first position, and the first AC output 64 is electrically connected with the electrical power distribution node 54 and the first AC input 62 is electrically disconnected from the APU 52 when the switch 80 is in the second position.

The control circuit 50 additionally is shown having a main machine AC output 86 coupled with the second AC input 70, and a main machine AC input 88 coupled with the second AC output 72. The second inverter/converter 60 is configured to selectively disconnect the main machine AC output 86 from the second AC input 70 and selectively connect the main machine AC input 88 to the second AC output 72 while the constant frequency starter/generator 55 is in a starting mode, and selectively disconnect the main machine AC input 88 from the second AC output 72 and selectively connect the main machine AC output 86 to the second AC input 70 while the constant frequency starter/generator 55 is in a generating mode. In this illustration, both the main machine AC input and output 86, 88 may be electrically coupled with the main machine stator 22 windings (not shown).

The control circuit 50 also comprises at least one controller, illustrated as a first controller 90 and a second controller 92 for controlling the operation of the constant frequency starter/generator 55. The first controller 90 is coupled with, and in bidirectional communication with, the first inverter/converter 56 and the electronic switch 80 via communication lines (illustrated as dotted lines). The second controller 92 is shown coupled with, and in bidirectional communication with, each of the first controller 90, the second inverter/converter 60, and the exciter inverter 40.

Each inverter/converter 56, 60 is configured to actively rectify a respective first and second AC input 62, 70 to a respective first and second DC output 68, 76. One example of an inverter/converter 56, 60 may be a three phase inverter/converter with neutral, such as a three phase four wire inverter/converter, or without neutral. Each inverter/converter 56, 60 may be configured such that the conversions from AC to DC produces a similar DC output 68, 76 voltage, for instance 28 VDC or 270 VDC.

Likewise, each inverter/converter 56, 60 is configured to invert a respective first and second DC input 66, 74 to a respective first and second AC output 64, 72. It is envisioned that each inverter/converter 56, 60 may be configured to allow dissimilar DC to AC conversions such that each AC output 64, 72 may differ in voltage or frequency. Additionally, while the first inverter/converter 56 may be configured to invert the DC input 66 to a constant frequency AC output 64, such as 400 Hz three-phase power, the second inverter/converter 60 may be configured to provide a variable second AC output 72 which may have one or more phases. The first and second inverter/converter 56, 60 may be constructed from a solid state inverter/converter material, such as silicon carbide (SiC) or gallium nitride (GaN) due to their ability to handle large power levels in smaller and lighter form factors. Alternative compositions or constructions of the first and second inverter/converters 56, 60 are envisioned.

While only a single coupling is shown for the plurality of AC inputs, outputs, and couplings 62, 64, 70, 72, 86, 88 it is envisioned that a plurality of conductors or wires may exist to account for each phase of a multi-phase signal. For example, it is envisioned that first AC input 62 may be comprised of three phase power, and thus, have three conductors represented in the figure by a single coupling. Likewise, it is understood that the second electronic switch 80 may be configured to switch to or from multiple AC power phases.

The electric machine assembly 10 according to the inventive method operates in two distinct modes: an starting mode and a generating mode, wherein the starting mode operates to provide starting torque and acceleration of the rotatable shaft 32 and the generating mode operates by steady-state self-sufficiency, and generates AC power.

At the start of the starting mode, the rotatable shaft 32 is not rotating, and the electronic switch 80 is in the first position. From this condition, the AC power input from the APU 52 is supplied to the electronic switch 80, which passes the power through the switch 80 to the output filter 78. The output filter 78 may or may not perform any filtering of the AC power from the APU 52, based on the electrical characteristics of the APU 52. For instance, the output filter 78 may not perform any filtering operation on AC power from an APU 52, but it may perform filtering operations on alternative power sources, such as AC power from another engine.

Next, the AC power is provided from the output filter 78 to the first AC input 62 at the first inverter/converter 56. The first inverter/converter will convert the AC power to a predetermined DC power, such as 28 VDC or 270 VDC, and provide the DC power to the DC link 58 via the first DC output 68. The DC link 58 transmits the DC power to the second DC input 74 of the second inverter/converter 60. The DC link 58 may also provide a DC power to the exciter inverter 40. Alternatively, the DC link 58 may not provide DC power to the exciter inverter 40 at this time. The second inverter/converter 60 inverts the DC power to an appropriate AC power, and provides the appropriate AC power to the second AC output 72.

The appropriate AC power is transmitted from the second AC output 72 to the main machine AC input 88 of the electric machine assembly 10. The AC power is driven into, for instance, the main machine stator 22 windings to generate a rotating magnetic field in the main machine stator 22, which in turn induces a current on the main machine rotor 20. The ensuing induced current generates sufficient torque upon the main machine rotor 20 to begin rotation of the attached rotatable shaft 32. Alternatively, the main machine AC input 88 may be coupled with any other set of windings or another electric machine assembly 10 component that may generate a starting torque on the rotatable shaft 32 in response to AC power.

During the aforementioned starting mode, each of the first and second controllers 90, 92 are communicating with, and operably controlling, the respective first and second inverter/converters 56, 60. For example, the first controller 90 may be controlling the conversion of the AC power to DC power in the first inverter/converter 56, which may be a steady or dynamic power conversion. Likewise, the second controller 92 may be controlling the conversion of the DC power to AC power in the second inverter/converter 60, and controls the supplying of the second AC output 72 to start the rotation of the main machine rotor 20.

Embodiments of the invention are envisioned wherein at least one of the controllers 90, 92 controls the constant frequency starter/generator 55 during the starting mode such that the second inverter/converter 60 supplies AC power to start the rotation of the main machine rotor 20 according to a starting method, algorithm, predetermined profile, optimized operation, frequency stepping-operation, or by a dynamic feedback profile based on physical or electrical characteristics of the electric machine assembly such as rated voltage or temperature measurements. Any of the aforementioned starting methods may be stored in either the first or second controller 90, 92, and it is envisioned that the bidirectional communication between the controllers 90, 92 may allow the controllers 90, 92 to act in a master/slave configuration, wherein one controller 90, 92 instructs the other controller 90, 92 how to apply the method.

Additionally, during the aforementioned starting mode, the second controller 92 may be controlling the exciter inverter 40 such that the exciter inverter 40 may or may not be inverting the DC power to an acceptable one, two, or three phase excitation signal. In any event, the second controller's 92 control of the exciter inverter 40 may be inconsequential because the excitation signal may not be transmitted to the exciter stator 16.

Once the rotatable shaft 32 reaches a minimal operational frequency, for instance, as defined by the method or algorithm, the at least one of the controllers 90, 92 instructs the constant frequency starter/generator 55 to change from starting mode to generating mode. At the time of this mode change, the main machine rotor 20 may be rotating, but not rotating at the expected operational speed for the electric machine assembly 10. At the time of the change from starting mode to generating mode, the first controller 90 instructs the second electronic switch to toggle from the first position to the second position, allowing the electrical power distribution node 54 to be coupled with the output filter 78.

During the generating mode, the rotation of the main machine rotor 20 generates a three phase output in the leads L4, L5, L6 of main machine stator 22, supplying power to the main machine AC output 86. The AC output 86 is supplied to the second inverter/converter 60, which in turn, rectifies the AC power to DC power, which is supplied to the DC link 58 via the second DC output 76. The DC link 58 further supplies this DC power to the exciter inverter 40. The second controller 92 controls the exciter inverter 40, for instance, according to a method or algorithm, to provide excitation to the exciter stator 16 wherein the excitation continues to lead the rotational frequency of the rotatable shaft 32. By leading the rotational frequency of the rotatable shaft 32, the controlled excitation accelerates the running electric machine assembly 10 to expected operational speed, or steady-state generating mode. During this acceleration period, at least one controller 90, 92 may control the first and/or second inverter/converters 56, 60 to prevent supplying the generated AC power to the electrical power distribution node.

During the steady-state generating mode, the electric machine assembly 10 is generating three phase power at leads L4, L5, L6, providing AC power at the main machine AC output 86. The AC power is provided from the electric machine assembly 10 the second AC input 70 of the second inverter/converter 60. The second inverter/converter 60 converts the AC power to DC power, and supplies the DC power to the DC link 58, which transmits the DC power to the first DC input 66 of the first inverter/converter 56. The first inverter/converter 56 inverts the DC power to AC power, and provides the AC power to the output filter 78 via the first AC output 64. The output filter 78 performs any electrical or signal filtering necessary, and provides the filtered AC power to the electrical power distribution node 54.

Additionally, during the steady-state generating mode, the first and second controllers 90, 92 control the operation of the constant frequency starter/generator to ensure sufficient power is generated for the electrical system of the aircraft. For instance, the first controller may monitor the DC to AC power inversion at the first inverter/converter 56 to ensure a sufficient amount of power is being provided to the electrical power distribution node 54. Additionally, the second controller 92 may control the second inverter/converter 60 to determine if enough power is being generated by the electric machine assembly 10, and if needed, control the exciter inverter 40 to alter the excitation of the assembly 10 to generate more or less power at the main machine AC output 86. Alternative configurations are envisioned wherein at least one of the controllers 90, 92 is able to sense, anticipate, or regulate electric machine assembly power output as needed.

Many other possible embodiments and configurations in addition to that shown in the above figures are contemplated by the present disclosure. For example, one embodiment of the invention contemplates a single controller that is configured to perform the controls of both of the aforementioned controllers 90, 92. Additionally, configurations are envisioned wherein, for instance, the electronic switch 80 is configured to be operable at different stages to allow for a staged or ordered change from starting mode to generating mode.

In another alternative embodiment of the invention, the electronic switch 80 may be integrated into existing components. In yet another embodiment, the at least one controller 90, 92 may have one or more electronic switches embedded to control the selective coupling of components described above, or one or more switch 80 may have a controller embedded.

In yet another embodiment of the invention, the DC link 58 may further include a DC power bus for powering DC loads within the aircraft. In such an embodiment, one of the controllers 90, 92 may have bidirectional communication with the DC power bus to ensure sufficient power is being provided, or adjust power regulation of the electrical machine assembly 10. It is further envisioned that the first and/or second controller 90, 92 may be configured to provide fault or diagnostic applications or information about the constant frequency starter/generator.

Furthermore, the electrical machine assembly 10 may include a permanent magnet generator (PMG) portion of the assembly 10, having a PMG rotor and a PMG stator. In this configuration, the PMG may be configured to generate some or all of the necessary exciter stator excitation, wherein the excitation may be controlled by, for instance, the second controller 92. Additionally, the design and placement of the various components may be rearranged such that a number of different in-line configurations could be realized.

The method disclosed herein provides for an aircraft engine starting using a constant frequency starter/generator. One advantage that may be realized in the above method is that the method provides sufficient starting torque at a constant frequency AC input. This method thus may replace pneumatic starting componentry, resulting in significant weight reduction and space requirements for the aircraft. The above described method may alternatively replace an electric integrated drive generator (IDG), constant speed drive (CSD) and/or an air turbine starter (ATS) units of an aircraft, resulting in a higher operating efficiency and lower weight restrictions for starting operations.

Additionally, the use of solid-state components for the inverter/converters results in increased reliability components for starting operations, reducing maintenance demands for the aircraft.

When designing aircraft components, important factors to address are size, weight, and reliability. The above described method has a decreased number of parts as the system will be able to provide a constant frequency starter/generator making the complete system inherently more reliable. This results in a lower weight, smaller sized, increased performance, and increased reliability system. The lower number of parts and reduced maintenance will lead to a lower product costs and lower operating costs. Reduced weight and size correlate to competitive advantages during flight.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A constant frequency starter/generator for a turbine engine comprising:

a first inverter/converter having a first constant frequency AC input, a first constant frequency AC output, a first DC input, and a first DC output;

a second inverter/converter having second AC input, a second AC output, a second DC input, and a second DC output;

a DC link electrically connecting the first DC output to the second DC input, and the second DC output to first DC input;

an electric machine having a synchronous main machine having an AC input electrically connected to the second AC output and an AC output electrically connected to the second AC input, and an AC exciter having an AC input electrically connected to a third AC output; and wherein the second inverter/converter operates in a starting mode, where the second inverter/converter electrically disconnects the main machine AC output from the second AC input and electrically connects the main machine AC input to the second AC output to start the main machine in the starting mode, and a generating mode, where the exciter AC input electrically connects to the third AC output, and the second inverter/converter electrically disconnects the main machine AC input from the second AC output and electrically connects the main machine AC output to the second AC input to run the main machine in a generating mode.

2. The constant frequency starter/generator of claim 1 further comprising a DC link electrically connecting the first inverter/converter to the second inverter/converter.

3. The constant frequency starter/generator of claim 2, further comprising an exciter inverter which selectively couples the exciter AC input to a DC output of the DC link during the generating mode.

4. The constant frequency starter/generator of claim 3 further comprising a first controller operably coupled to and controlling the operation of the first inverter/converter.

5. The constant frequency starter/generator of claim 4, further comprising a second controller operably coupled to and controlling the operation of the second inverter/converter and exciter inverter.

6. The constant frequency starter/generator of claim 5 wherein the second controller is in bi-directional communication with at least one of the second inverter/converter, exciter inverter, DC link, or first controller.

7. The constant frequency starter/generator of claim 6 wherein the first controller is in bi-directional communication with the first inverter/converter.

8. The constant frequency starter/generator of claim 1 wherein at least one of the first or second inverter/converter further comprises a solid state inverter/converter.

9. The constant frequency starter/generator of claim 8 wherein the solid state inverter/converter further comprises at least one of silicon carbide or gallium nitride.

10. A method of operating an electric machine having a synchronous main machine and exciter, the method comprising:

starting the electric machine in a starting mode by receiving an AC input from an external power source, converting the AC input to a DC output with a first inverter/converter, converting the DC output to a second AC input by supplying the DC output to a second inverter/converter, and supplying a second AC output from the second inverter/converter to the main machine to start rotation of the main machine;

after the starting of rotation of the main machine, running the electric machine in a generating mode by accelerating the synchronous main machine by supplying a third AC output to the exciter; and supplying generated electricity by generating a fourth AC output with the main machine during the generating mode, converting the fourth AC output to a second DC output with the second inverter/converter, and converting the second DC output to a fifth AC output.

11. The method of operating an electric machine of claim 10, wherein during the starting the electric machine, a controller controls the supplying of the second AC output to the main machine to start rotation of the main machine according to at least one of an algorithm, predetermined profile, or feedback profile.

12. The method of operating an electric machine of claim 11 wherein the after the starting of rotation the controller controls the supplying the third AC output to the exciter.

13. The method of operating an electric machine of claim 11 wherein the supplying generated electricity further comprises the controller controlling at least of one the first inverter/converter, second inverter/converter, or generation of electricity by the electric machine.

14. The method of operating an electric machine of claim 13 wherein the controlling of the at least of one the first inverter/converter, second inverter/converter, or generation of electricity by the electric machine is determined by at least one of sensed or anticipated fifth AC output characteristics.

* * * * *

UNITED STATES PATENT AND TRADEMARK OFFICE
CERTIFICATE OF CORRECTION

PATENT NO. : 9,035,478 B2
APPLICATION NO. : 14/010037
DATED : May 19, 2015
INVENTOR(S) : Huang et al.

It is certified that error appears in the above-identified patent and that said Letters Patent is hereby corrected as shown below:

IN THE CLAIMS

In Column 9, Line 19, in Claim 13, delete "of one the" and insert -- one of the --, therefor.

In Column 9, Line 23, in Claim 14, delete "of one the" and insert -- one of the --, therefor.

Signed and Sealed this
Fifth Day of January, 2016

Michelle K. Lee
*Director of the United States Patent and Trademark Office*